(12) United States Patent
Panton (10) Patent No.: US 10,305,996 B2
(45) Date of Patent: May 28, 2019

(54) SYSTEM, DEVICE, AND METHOD FOR SERVICE COORDINATION

(71) Applicant: PRN PRODUCTIONS, INC., San Jose, CA (US)

(72) Inventor: Ian Benjamin Panton, San Jose, CA (US)

(*) Notice: Subject to any disclaimer, the term of this patent is extended or adjusted under 35 U.S.C. 154(b) by 205 days.

(21) Appl. No.: 15/331,684

(22) Filed: Oct. 21, 2016

(65) Prior Publication Data

US 2017/0163743 A1   Jun. 8, 2017

Related U.S. Application Data

(60) Provisional application No. 62/386,549, filed on Dec. 7, 2015.

(51) Int. Cl.
| | | |
|---|---|---|
| *H04L 12/58* | (2006.01) | |
| *H04L 29/06* | (2006.01) | |
| *H04L 29/08* | (2006.01) | |

(52) U.S. Cl.
CPC .............. *H04L 67/16* (2013.01); *H04L 51/20* (2013.01); *H04L 51/32* (2013.01); *H04L 67/10* (2013.01); *H04L 67/125* (2013.01); *H04L 67/18* (2013.01); *H04L 67/34* (2013.01); *H04L 67/42* (2013.01)

(58) Field of Classification Search
USPC ........................................................ 709/203
See application file for complete search history.

(56) References Cited

U.S. PATENT DOCUMENTS

| | | | |
|---|---|---|---|
| 6,366,196 B1 | 4/2002 | Green et al. | |
| 7,386,318 B2* | 6/2008 | Moon ................. | G06F 17/3087 |
| | | | 455/414.1 |
| 8,493,217 B2 | 7/2013 | Biessman et al. | |
| 9,098,985 B2 | 8/2015 | Hetterly | |
| 9,117,231 B2 | 8/2015 | Rodgers et al. | |
| 9,240,006 B2 | 1/2016 | White et al. | |

(Continued)

FOREIGN PATENT DOCUMENTS

| | | |
|---|---|---|
| DE | 102007019822 A1 | 10/2008 |
| WO | 2013110942 A1 | 8/2013 |

OTHER PUBLICATIONS https://web.archive.org/web/20131127021627/http://serviceplease.info/index.php, Internet Archive, Nov. 27, 2013, 1 Page, Carlton Beds MK43 7LE, UK.

(Continued)

*Primary Examiner* — Umar Cheema
*Assistant Examiner* — John Fan
(74) *Attorney, Agent, or Firm* — Olav M. Underdal; IDP Patent Services (57) ABSTRACT

A system for service coordination, includes a service coordination server, including a map manager, a service manager, and a service user registry; and first and second service coordination clients, each comprising a location manager, a map controller, and respectively a service receiver and a service requester, such that a customer user creates a service request, including place of service, point of service, and optionally type of service, that is received by a service user. Also disclosed is a method for service coordination, including selecting place of service, selecting points of service, requesting service, and receiving service request.

13 Claims, 4 Drawing Sheets

(56) References Cited

U.S. PATENT DOCUMENTS

| | | |
|---|---|---|
| 2005/0027871 A1* | 2/2005 | Bradley .............. H04L 67/1061 |
| | | 709/227 |
| 2011/0068942 A1 | 3/2011 | Solheim |
| 2011/0197807 A1 | 8/2011 | Mannke |
| 2012/0050019 A1 | 3/2012 | Castro et al. |
| 2012/0158821 A1* | 6/2012 | Barros ................. G06F 9/5055 |
| | | 709/203 |
| 2012/0209729 A1 | 8/2012 | Lovegreen |
| 2012/0296680 A1 | 11/2012 | Jantz et al. |
| 2012/0323707 A1 | 12/2012 | Urban |
| 2014/0114775 A1 | 4/2014 | Cloin et al. |
| 2014/0156319 A1 | 6/2014 | Deeb |
| 2014/0164126 A1* | 6/2014 | Nicholas ............ G06Q 30/0261 |
| | | 705/14.58 |
| 2014/0204834 A1* | 7/2014 | Singh ................... H04W 40/22 |
| | | 370/315 |
| 2015/0088676 A1* | 3/2015 | Elliott ................. G06Q 20/202 |
| | | 705/21 |
| 2015/0143456 A1* | 5/2015 | Raleigh ................ H04W 12/08 |
| | | 726/1 |

OTHER PUBLICATIONS http://web.archive.org/web/20140806194556/http://waitrapp.com/, Internet Archive, Aug. 6, 2014, 3 Pages, Lake Charles, LA 70605, USA.

* cited by examiner

Service Coordination Device

SYSTEM, DEVICE, AND METHOD FOR SERVICE COORDINATION

CROSS-REFERENCE TO RELATED APPLICATIONS

This application claims the benefit of U.S. Provisional Application No. 62/386,549, filed Dec. 7, 2015.

FIELD OF THE INVENTION

The present invention relates generally to the field of ordering service, and more particularly to methods and systems for requesting service from a service person, wait staff, and/or attendant.

BACKGROUND OF THE INVENTION

When guests are seated or located in a busy restaurant, or other place where personal service is need, it can often be difficult to request service, and customers may frequently have to wait for prolonged periods of time, for example to order additional items or request the check/bill.

However, such systems often rely on installation of hardware in the restaurant or service location, and therefore can be complex and costly to install for the restaurant or service operator.

As such, considering the foregoing, it may be appreciated that there continues to be a need for novel and improved devices and methods for requesting service from a service person and/or attendant.

SUMMARY OF THE INVENTION

The foregoing needs are met, to a great extent, by the present invention, wherein in aspects of this invention, enhancements are provided to the existing model of for requesting service from a service person and/or attendant.

In an aspect, a system for service coordination, includes:
a) a service coordination server; and
b) a first service coordination client, which is configured for use by a service user; and
c) a second service coordination client, which is configured for use by a customer user; and
such that the service coordination server is configured to receive and store a request for service from the at least one second service coordination device, wherein the request for service can include a place of service, a point of service, and a type of service; and
wherein the service coordination server is configured to send the request for service to the first service coordination device, such that the service user is informed about the customer user requesting service at the point of service.

In a related aspect, the service coordination server can further include:
a) a processor;
b) a non-transitory memory;
c) an input/output component;
d) a map manager, which is configured to store map information and location information for a plurality of places of service;
e) a service manager, which is configured to receive, store, and process requests for service; and
f) a service user registry, which is configured to receive, store, and process a plurality of active service registrations, wherein each active service registration comprises an active service user, a place of service, and at least one associated point of service; all connected via
g) a data bus.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a system for service coordination 100 with reference to FIG. 1, in such manner that like reference numerals refer to like components throughout; a convention that we shall employ for the remainder of this specification.

Figure 1:
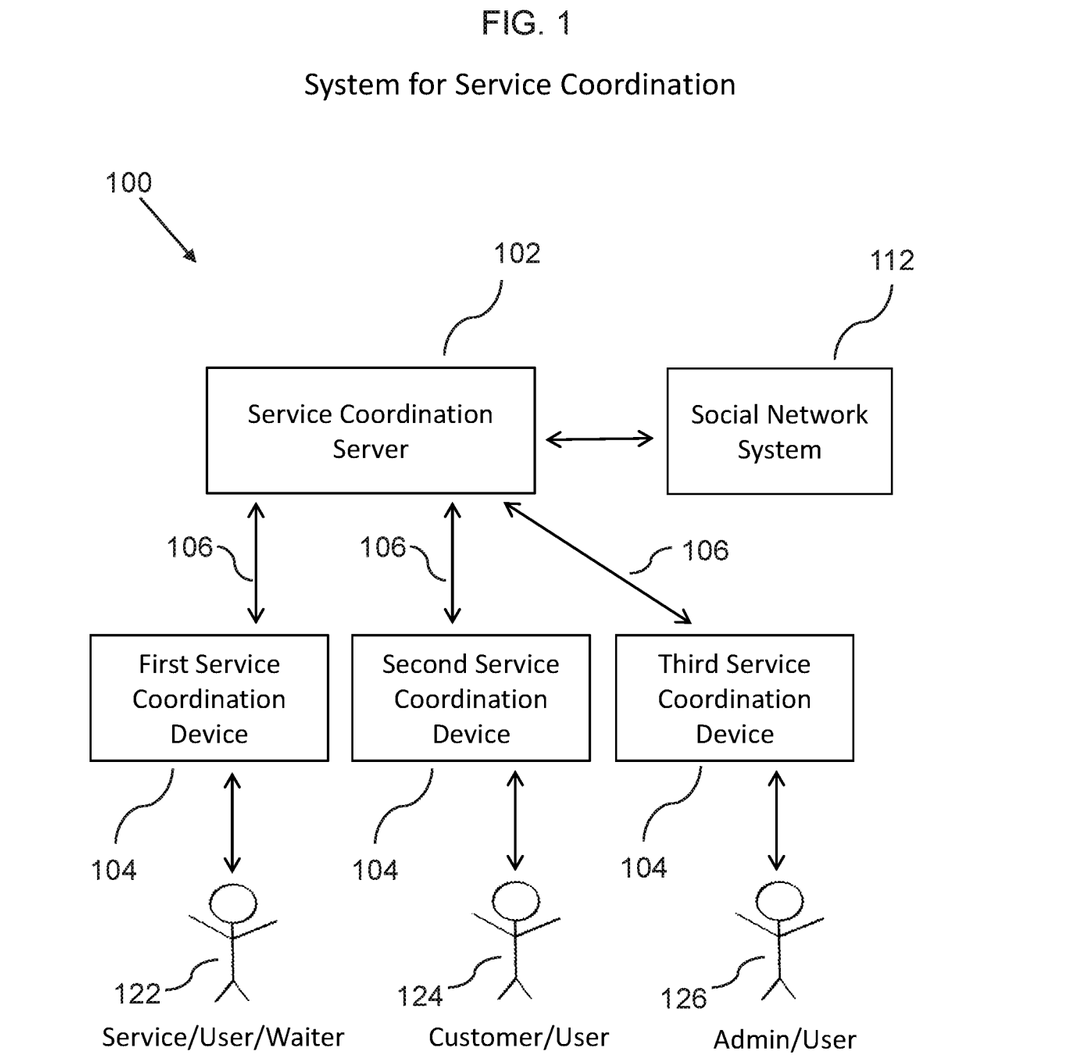
FIG. 1 is a schematic diagram illustrating a system for service coordination, according to an embodiment of the invention.

In an embodiment, as shown in FIG. 1, a system for service coordination 100 can include:
a) a service coordination server 102; and
b) at least one first service coordination client 104, which is connected to the service coordination server 102 via a network 106, such that the first service coordination client is configured for use by a waiter/attendant/service user 122; and
c) at least one second service coordination client 104, which is connected to the service coordination server 102 via a network 106, such that the second service coordination client 104 is configured for use by a customer/user 124; and
wherein the service coordination server 102 is configured to receive a request for service from the second service coordination device 104, wherein the request for service comprises a type of service, a place of service, and a point of service; and
wherein the service coordination server 102 is configured to send the request for service to the first service coordination device 104, wherein the service user 122 is registered on the service coordination server 102 as an active service user 122 for the place of service and the point of service, whereby the service/user 122 is informed about the type of service and the point of service. In related embodiments, the service user 122 can for example be a server/wait staff/waiter/waitress in a restaurant, or a sales or service person/associate in a shop or other business location.

Figure 2:
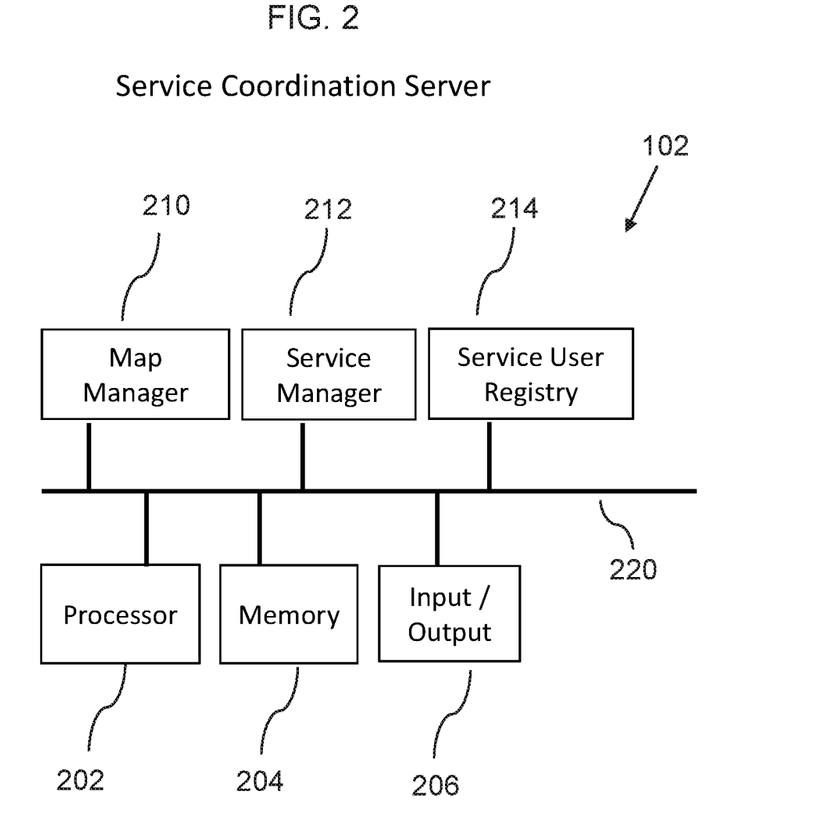
FIG. 2 is a schematic diagram illustrating a service coordination server, according to an embodiment of the invention.

In a related embodiment, a service coordination server 102 can include:
a) A processor 202;
b) A non-transitory memory 204;
c) An input/output component 206;
d) A map manager 210, which is configured with map information and location information for a plurality of places of service;
e) A service manager 212, which is configured to receive, store, and process requests for service; and
f) A service user registry 214, which is configured to receive, store, and process a plurality of active service registrations, wherein each active service registration comprises a service user identifier, a place of service, and at least one associated point of service, such as for example a table or set of tables that the service user 122 is waiting on in restaurant; all connected via
g) A data bus 220.

Figure 3:
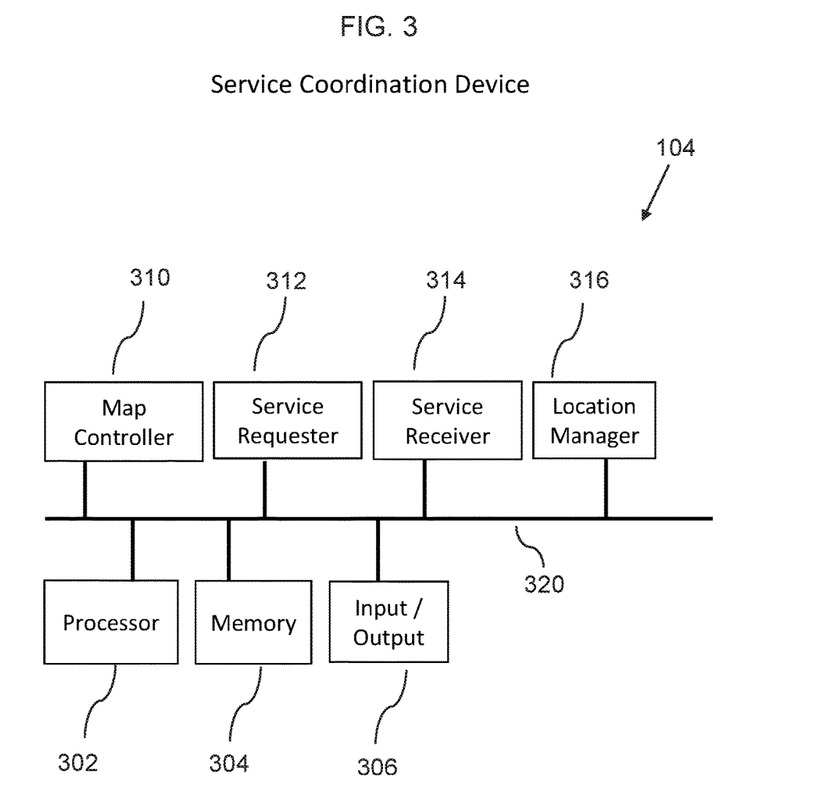
FIG. 3 is a schematic diagram illustrating a service coordination device, according to an embodiment of the invention.

In a related embodiment, a service coordination device 104 can comprise:
a) A processor 302;
b) A non-transitory memory 304;
c) An input/output 306;
d) A location manager 316, which is configured to determine a current location;
e) A map controller 310, which is configured to show a map of the current location, wherein the map shows local places of service, wherein the map and the local places of service are received in communication with the service coordination server 102; and wherein the customer/user 124 is enabled to select a requested place of service from the local places of service;
f) A service requester 312; which is configured to enable the customer/user 124 to send a request for service, in communication with the service manager 212 of service coordination server 102; and
g) A service receiver 314; which is configured to enable the service user 122 to receive a request for service, in communication with the service manager 212 of service coordination server 102; all connected via
h) A data bus 320.

In related embodiments, the service coordination device 104 can include configurations as:
a) A web application, executing in a Web browser;
b) A tablet app, executing on a tablet device, such as for example an Android or iOS tablet device;
c) A mobile app, executing on a mobile device, such as for example an Android phone or iPhone, or any wearable mobile device;
d) A desktop application, executing on a personal computer, or similar device;
e) An embedded application, executing on a processing device, such as for example a smart TV, a game console or other system.

In a related embodiment, a service coordination device 104 can be simultaneously configured to provide functions for a service user 122 and a customer 124, such that the service coordination device 104, includes functions of both the first and second service coordination devices 104, such that a user 122 124 can interact via the service coordination device 104 as both a service user 122 and a customer user 124, for example if the user 122 124 is currently serving customers in a first place of service, and is requesting or will later request service from a second place of service.

In another related embodiment, the service requester 312 of the service coordination device 104 can be configured to determine a point of service, such as a table in a restaurant, based on comparing a current location obtained in communication with the location manager, with the table location, such that the service requester 312 is further configured to determine a point of service by finding the point of service with a point of service location that is within a predetermined closeness threshold to a current location obtained in communication with the location manager.

In yet another related embodiment, the service requester 312 of the service coordination device 104 can be configured to determine a point of service, such as a table in a restaurant, such that the customer/user 124 is enabled to select a point of service, by selecting from a list or by typing a point of service number, such as for example a table number, such that a service request, comprising the place of service and the point of service, is stored in the service manager 212 of the service coordination server 102.

In a further related embodiment, the service requester 312 can further be configured to enable the customer/user 124 to select the type of service, such that the service request further comprises a type of service, wherein the type of service can for example be General, More Bread Please, More Water Please, Desert Menu Please, etc.

In a related embodiment, the service requester 312 of the first service coordination device 104 can be configured to receive a request to alert service user, such that the request is communicated to the service manager 212 of the service coordination server 102, such that the request to alert service user is received by the service receiver 314 of the second service coordination device 104, such that a service alert is communicated to the service user 122. The service alert can for example be a screen alert, a text message displayed by the service receiver 314, a mobile text message, a sound, and/or an activation of a vibrator function on the second service coordination device 104 for the purpose of alerting the service user 122.

In a further related embodiment, a vibration issued with the vibrator function can have a unique vibration pattern to discern from other app notification, such that the service user 122 can be notified without having to remove the second service coordination device 104 (i.e. his phone) from his pocket. Based on the service alert vibration the service user 122 can then go to covered tables to look for a customer in need of service. If need be, waiter can see text of table number requested.

In another related embodiment, the service receiver 314 of the first service coordination device 104 can be configured to enable a service user 122 to select a selected place of service from the local places of service, and select a plurality of points of service from available points of service that are associated with the selected place of service, such that that the service user 122 is registered as an active service user 122 for the selected place of service and the plurality of points of service, in communication with the service manager 212 of the service coordination server 102, such that the service user registry 214 adds active service registrations for the active service user 122, the selected place of service and the selected plurality of points of service. The service user 122 can be enabled to select a point of service, by selecting from a list or by typing a point of service number, such as for example a table number.

In a further related embodiment, the service receiver 314 can be configured to enable the service user 122 to select all available points of service for a selected place of service, for example by pressing a "select all tables" button.

In a related embodiment, the service requester 312 of the service coordination device 104 can be configured to determine a point of service, such as a table in a restaurant, such that the customer/user 124 is enabled to select a point of service, by selecting from a list or by typing a point of service number, such as for example a table number.

In a related embodiment, the location manager 312 of the service coordination device 104 can be configured to use a location service on the service coordination device 104, such as a GPS location service. The location service can for example be implemented using the Google™ Location API and/or the Google™ Restful API. In further related embodiments, functions of the location manager 312 can alternatively be implemented completely or partially in the service coordination server 102.

In a related embodiment, the service manager 212 of the service coordination server 102 can be configured to deny/filter/ignore a request for service, which is originating from a request location that is more than a customized/predetermined distance away from the place of service, such that the request for service is not stored by the service manager 212. This can for example prevent a customer/user 124 from submitting a false, accidental, and/or mistaken service request. The predetermined distance can for example be 500 feet.

In a related embodiment, the service manager 212 of the service coordination server 102 can be configured to deny/filter/ignore a request for service, which is originating from a request location that is more than a customized/predetermined distance away from the place of service, such that the request for service is not stored by the service manager 212. This can for example prevent a customer/user 124 from submitting a false, accidental, and/or mistaken service request. The predetermined distance can for example be 500 feet.

In a related embodiment, the service manager 212 of the service coordination server 102 can be configured to remove an active service registration for the selected place of service for the service user 122, when the service manager receives a message from the location manager 316 of the second service coordination device 104, wherein the message indicates that the second service coordination device has 104 detected that the second service coordination device has 104 moved more than a predetermined movement threshold away from the place of service, thereby indicating that the service user 122 has left the place of service, i.e. for example a restaurant.

In another related embodiment, the service receiver 314 of the first service coordination device 104, can be configured to show associated points of service, i.e. for example tables, and associated customers/users 124, for associated points for service which are associated with the service user 122 who is using the first service coordination device 104, in communication with the service manager 212, which performs a look up in the stored service requests.

In another related embodiment, the service receiver 314 of the first service coordination device 104, can be configured to show associated points of service, i.e. for example tables, and associated customers/users 124, which are associated with each service user 124 who is registered in the place of service, i.e. for example a restaurant, in communication with the service manager 212, which performs a look up in the stored service requests.

In a related embodiment, the service manager 212 of the service coordination server 102 can be configured to send a sign-up request to a user site for a place of service in a social network system 112, the user site can for example be a restaurant page on a social network system 112, such as on Facebook, Yelp, Twitter, etc.

In related embodiment, the service coordination device 104 can be configured for use as a third service coordination device 104, which can be configured for use by an admin/user 126, such that the admin/user 126 can perform setup functions, including setting up service registrations for a plurality of service users 122.

In a further related embodiment, the sign-up request can be a posting on the user site (such as a main/home page, profile page, wall, etc.), wherein the posting requests for an admin/user 126 or a service user 122 to register as a user on the service coordination server, such that customer/users 124 can request service. The posting can include an installation link, such as a website URL for signup or a link to an app installation, for installing the service coordination device 104, in the form of an app on a mobile device/phone.

In a related embodiment, the service manager 212 can be configured to send the sign-up request, when the service manager receives a message from the service requester 312 of the second service coordination device 104, based on input from the customer/user 124, whereby the customer/user 124 is requesting that the place of service, such as a restaurant, participate in the system for service coordination 100.

In related embodiments, the service coordination device 104 can be identified for system communication purposes by a device ID, URL, GUID, or other conventional identifier, and can communicate with the service coordination server 102 via well-known methods of client/server communication, including use of socket communication and messaging frameworks, such as Google Cloud Messaging™.

It shall be understood that an executing instance of an embodiment of the system for service coordination 100, as shown in FIG. 1, can include a plurality of service coordination devices 104 that are configured for use by a waiter/user 122, which each can be tied to one or more users 122, and a plurality of service coordination devices 104 that are configured for use by a customer/user 124, which each can be tied to one or more users 122.

An executing instance of an embodiment of the system for service coordination 100, as shown in FIG. 1, can similarly include a plurality of service coordination servers 102.

Figure 4:
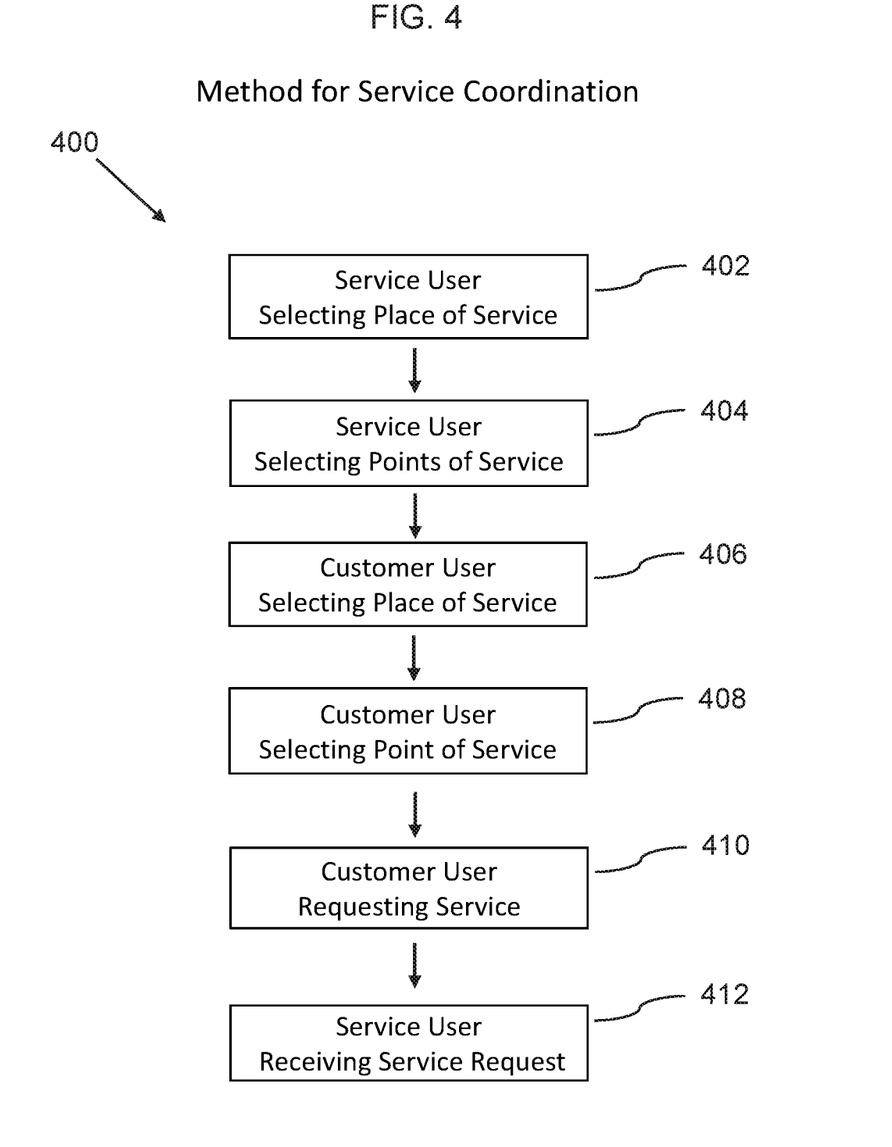
FIG. 4 is a flowchart illustrating steps that may be followed, in accordance with one embodiment of a method or process of service coordination.

In an embodiment, as illustrated in FIG. 4, a method for service coordination 400, can include:
a) Service user selecting place of service 402, wherein a service user 122 selects a place of service, by use of a first service coordination device 104;
b) Service user selecting points of service 404, wherein the service user 122 selects a plurality of points of service, by use of the first service coordination device 104;
c) Customer selecting place of service 406, wherein a customer/user 124 selects the place of service, by use of a second service coordination device 104;
d) Customer selecting point of service 408, wherein the customer/user 124 selects a point of service, by use of the second service coordination device 104, wherein the selected point of service is a member of the plurality of points of service, which were selected by the service user 122;
e) Customer requesting service 410, wherein the customer/user 124 sends a request for service to the service user 122, via a service coordination server 102, wherein the request for service is sent by use of the second service coordination device 104; and
f) Service user receiving request 412, wherein the service user 122 receives the request for service, via the service coordination server 102, wherein the request for service is received by use of the first service coordination device 104.

FIGS. 1, 2, 3 and 4 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, and 3 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random access memory (RAM) and read-only memory (ROM). The computer also may include nonvolatile storage memory, such as a hard disk drive, where additional data can be stored.

FIG. 1 shows a depiction of an embodiment of the system for service coordination 100, including the service coordination server 102, and the service coordination device 104. In this relation, a computer server shall be understood to represent a general computing capability that can be physically manifested as one, two, or a plurality of individual physical computing devices, located at one or several physical locations. A server can for example be manifested as a shared computational use of one single desktop computer, a dedicated server, a cluster of rack-mounted physical servers, a datacenter, or network of datacenters, each such datacenter containing a plurality of physical servers, or a computing cloud, such as Amazon EC2 or Microsoft Azure.

It shall be understood that the above-mentioned components of the service coordination server 102 and the service coordination device 104 are to be interpreted in the most general manner.

For example, the processors 202 302 can each respectively include a single physical microprocessor or microcontroller, a cluster of processors, a datacenter or a cluster of datacenters, a computing cloud service, and the like.

In a further example, the non-transitory memory 204 and the non-transitory memory 304 can each respectively include various forms of non-transitory storage media, including random access memory and other forms of dynamic storage, and hard disks, hard disk clusters, cloud storage services, and other forms of long-term storage. Similarly, the input/output 206 and the input/output 306 can each respectively include a plurality of well-known input/output devices, such as screens, keyboards, pointing devices, motion trackers, communication ports, and so forth.

Furthermore, it shall be understood that the service coordination server 102 and the service coordination device 104 can each respectively include a number of other components that are well known in the art of general computer devices, and therefore shall not be further described herein. This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the service coordination device 104 communicates with the service coordination server 102 over a network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the . . . device, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

For example, alternative embodiments can reconfigure or combine the components of the service coordination server 102 and the service coordination device 104. The components of the service coordination server 102 can be distributed over a plurality of physical, logical, or virtual servers. Parts or all of the components of the service coordination device 104 can be configured to operate in the service coordination server 102, whereby the service coordination device 104 for example can function as a thin client, performing only graphical user interface presentation and input/output functions. Alternatively, parts or all of the components of the service coordination server 102 can be configured to operate in the service coordination device 104.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A system for service coordination, comprising:
a) a service coordination server, which is configured to receive, store, and process requests for service; and
b) at least one first service coordination device, which is connected to the service coordination server via a network, such that the least one first service coordination device is configured for use by a service user, wherein the at least one first service coordination device further comprises:
a first processor;
a first non-transitory memory; and
a first input/output; all connected via
a first data bus;
wherein the at least one first service coordination device is configured to determine a first current location of the at least one first service coordination device;
wherein the at least one first service coordination device is configured to show a first map of the first current location, wherein the first map shows first local places of service, wherein the first map and the first local places of service are received in communication with the service coordination server; and wherein the service user is enabled to select a current place of service from the first local places of service; and
wherein the at least one first service coordination device is configured to send the service user a request for service, in communication with the service coordination server; and
c) at least one second service coordination device, which is connected to the service coordination server via the network, such that the at least one second service coordination device is configured for use by a customer user, wherein the at least one second service coordination device further comprises:
a second processor;
a second non-transitory memory; and
a second input/output; all connected via
a second data bus;
wherein the at least one second service coordination device is configured to determine a second current location;
wherein the at least one second service coordination device is configured to show a second map of the second current location, wherein the second map shows second local places of service, wherein the second map and the second local places of service are received in communication with the service coordination server; and wherein the customer user is enabled to select a requested place of service from the second local places of service; and
wherein the at least one second service coordination device is configured to send the request for service to the service coordination server, based on input from the customer user, whereby the customer user requests service; and
wherein the service coordination server is configured to receive and store the first request for service from the at least one second service coordination device, wherein the first request for service comprises the requested place of service and a point of service;
wherein the at least one second service coordination device is configured to determine the point of service by finding the point of service with a point of service location that is within a predetermined closeness threshold to the second current location of the at least one second service coordination device, wherein the second current location is obtained in communication with the at least one second service coordination device;

wherein the service coordination server is configured to remove a service request for the customer user, when the service coordination server receives a message from the at least one second service coordination device, wherein the message indicates that the at least one second service coordination device has detected that the at least one second service coordination device has moved more than a predetermined movement threshold away from a location of the requested place of service, thereby indicating that the customer user has left the requested place of service; and wherein the service coordination server is configured to send the request for service to the at least one first service coordination device, wherein the service user is registered on the service coordination server as an active server user for the requested place of service and the point of service, whereby the service user is informed about the point of service requesting service.

2. The system for service coordination of claim 1, wherein the service coordination server further comprises:
a) a processor;
b) a non-transitory memory; and
c) an input/output component; all connected via
d) a data bus;

wherein the service coordination server is configured to store map information and location information for a plurality of places of service; and wherein the service coordination server is configured to receive, store, and process a plurality of active service registrations, wherein each active service registration comprises an active service user, a place of service, and at least one associated point of service.

3. The system for service coordination of claim 1, wherein the at least one second service coordination device is further configured to determine the point of service, such that the customer user is enabled to select the point of service, such that the service request, comprising the requested place of service and the point of service, is stored in the service coordination server.

4. The system for service coordination of claim 3, wherein the at least one second service coordination device is further configured to enable the customer user to select a point of service by inputting a point of service number.

5. The system for service coordination of claim 3, wherein the at least one second service coordination device is further configured to enable the customer user to select a type of service, such that the service request further comprises a type of service.

6. The system for service coordination of claim 1, wherein the at least one first service coordination device is further configured to enable the service user to select a plurality of points of service from available points of service that are associated with the current place of service.

7. The system for service coordination of claim 2, wherein the service coordination server is configured to deny a request for service, which is originating from a request location that is more than a predetermined distance away from a location of the place of service, such that the request for service is not stored by the service coordination server.

8. The system for service coordination of claim 1, further comprising:
a social network system;

wherein the service coordination server is further configured to-send a sign-up request to a user site for a requested place of service in the social network system;

wherein the service coordination server is configured to send the sign-up request, when the service coordination server receives a message from the at least one second service coordination device, based on input from the customer user, whereby the customer user requests that the requested place of service participate in the system for service coordination.

9. The system for service coordination of claim 8, wherein the sign-up request is a posting on the user site in the social network system, wherein the posting comprises a link, wherein the link is configured to install the at least one first service coordination device for the service user.

10. A service coordination server, comprising:
a) a processor;
b) a non-transitory memory; and
c) an input/output component;

wherein the service coordination server is configured to store map information and location information for a plurality of places of service;

wherein the service coordination server is configured to receive, store, and process requests for service;

wherein the service coordination server is configured to receives, stores, and processes a plurality of active service registrations, wherein each active service registration comprises an active service user, a place of service, and at least one associated point of service;

wherein the service coordination server is configured to receive and store a first request for service from a second service coordination device, wherein the first request for service comprises a place of service and a point of service;

wherein the service coordination server is configured to send the request for service to a first service coordination device, wherein a service user is registered on the service coordination server as an active server for the place of service and the point of service, whereby the service user is informed about the point of service requesting service;

wherein the service coordination server is configured to deny a request for service, which is originating from a request location that is more than a predetermined distance away from a location of the place of service, such that the request for service is not stored by the service coordination server; and wherein the service coordination server is configured to remove a service request for a customer user, when the service coordination server receives a message from the second service coordination device, wherein the message indicates that the second service coordination device has detected that the second service coordination device has moved more than a predetermined movement threshold away from a location of the place of service, thereby indicating that the customer user has left the place of service.

11. A method for service coordination, comprising:
a) service user selecting place of service, wherein a service user selects a place of service, by use of a first service coordination device;
b) service user selecting points of service, wherein the service user selects a plurality of points of service, by use of the first service coordination device;
c) customer user selecting place of service, wherein a customer user selects the place of service, by use of a second service coordination device;

d) customer user selecting a point of service, wherein the customer user selects the point of service, by use of the second service coordination device,
   wherein the second service coordination device determines the point of service by finding the point of service with a point of service location that is within a predetermined closeness threshold to a current location of the second service coordination device;
e) customer user requesting service, wherein the customer user sends a request for service to the service user, via a service coordination server, wherein the request for service is sent by use of the second service coordination device;
f) service user receiving request, wherein the service user receives the request for service, via the service coordination server, wherein the request for service is received by use of the first service coordination device; and g) removing a service request for the customer user, by receiving a message from the second service coordination device, wherein the message indicates that the second service coordination device has detected that the second service coordination device has moved more than a predetermined movement threshold away from a location of the place of service, thereby indicating that the customer user has left the place of service.

12. The method for service coordination of claim 11, wherein the customer user selects the point of service by inputting a point of service number on the second service coordination device.

13. The method for service coordination of claim 11, wherein the customer user selects a type of service, such that the service request further comprises the type of service.

* * * * *